INVENTORS:
Llewellyn Heard
Marvin Den Herder
BY Vandeveer Voorhees
ATTORNEY

Patented May 6, 1952

2,595,339

UNITED STATES PATENT OFFICE 2,595,339

COGELATION OF SILICA AND ALUMINA SOLS AT pH 3.5–6.5

Marvin Den Herder, Chicago, Ill., and Llewellyn Heard, Hammond, Ind., assignors to Standard Oil Company, Chicago, Ill., a corporation of Indiana Application December 29, 1948, Serial No. 67,984

7 Claims. (Cl. 252—453)

This invention relates to a catalyst and method of making it. More particularly, it relates to a catalyst of the alumina-silica type effective for the conversion of hydrocarbons. Still more particularly the invention relates to a cogel of silica-alumina in which the alumina comprises a substantial proportion of the catalyst.

In the catalytic cracking process the catalyst is first contacted with hydrocarbon vapor at conversion temperature of about 900–1000 F. until carbon formed on the catalyst reduces activity materially, whereupon the catalyst is regenerated by burning under controlled conditions. It is necessary for the catalyst to speed the cracking reaction and also withstand the regeneration burning at red heat and in the presence of regeneration gases without serious permanent loss of catalytic activity or other undesirable changes.

One object of the invention is to provide a catalyst for the cracking of hydrocarbons which is resistant to deterioration during use and on heating in the presence of steam, as occurs in catalyst regeneration. Another object of the invention is to provide a catalyst which will produce a favorable distribution of products when employed in a cracking reaction, particularly a low ratio of gas and coke to liquid products. A further object of the invention is to provide a catalyst having a high ratio of alumina to silica in the form of an ultragel with high physical strength and resistance to disintegration by attrition, particularly as encountered in the fluidized solid cracking process. A still further object of the invention is to provide a silica-alumina catalyst effective for cracking high sulfur oils with elimination of sulfur from the gasoline product.

The invention is illustrated by drawings which show in Figure 1 a graphical representation of the catalyst activity in relation to the alumina content of the fresh catalyst and also the catalyst after high temperature steam treatment.

Figure 1:
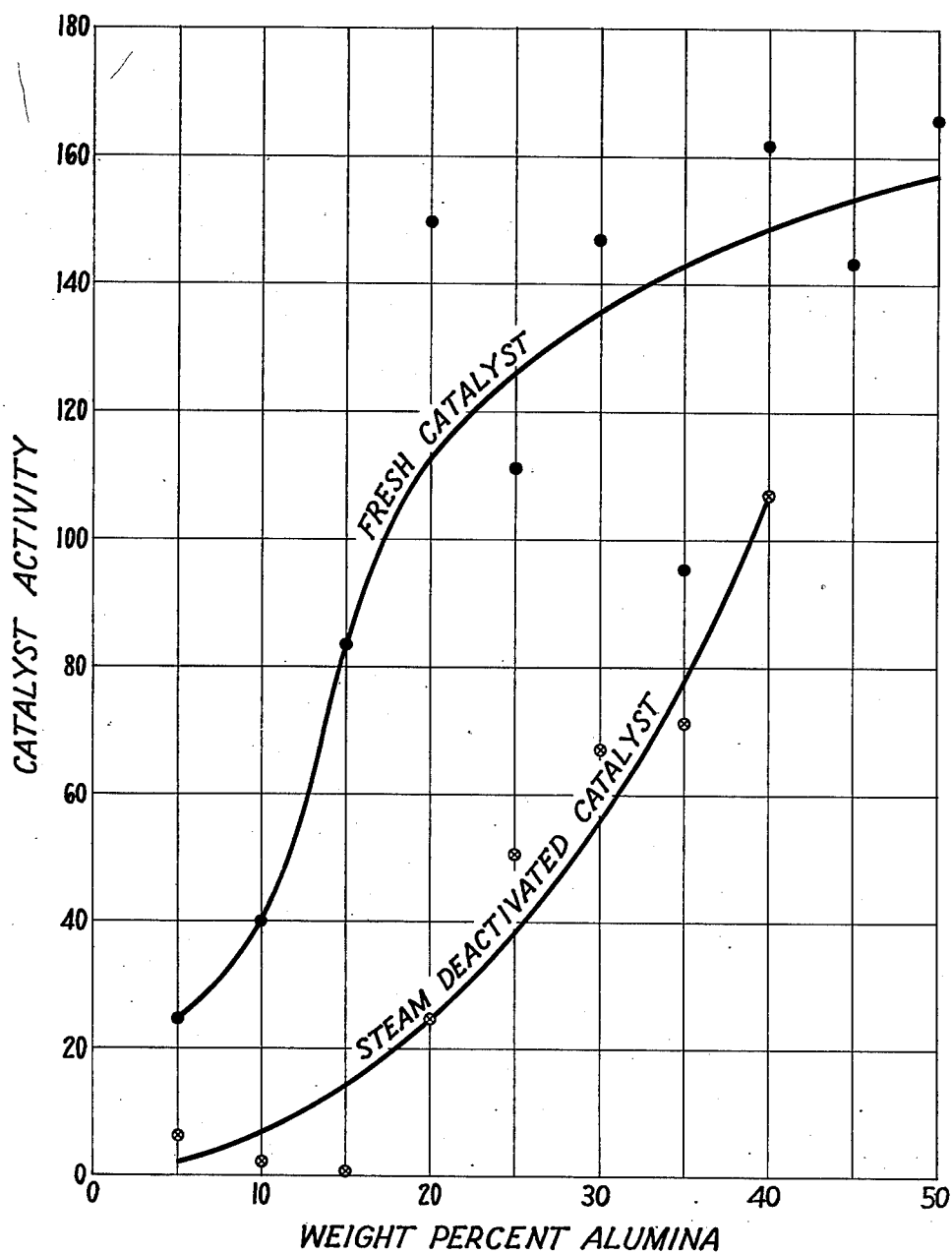

In the catalytic conversion of hydrocarbons and particularly in the catalytic cracking reaction, catalysts of silica and alumina in combination have long been recognized as particularly effective when prepared from active forms of silica and alumina. To obtain maximum activity, great care is required in selecting the proper form of silicon and aluminum oxides. Furthermore, the characteristics of the catalyst are dependent to a large extent on the manner in which the oxides are brought into combination. Perhaps the most effective catalysts are produced from silica and alumina in the form of their gels and these can be combined in various ways. For example, the gels may be separately prepared and simply ground together. The ingredients may also be combined in the form of their hydrogels as shown in U. S. Patent 2,369,734. The gels may be mixed when freshly gelled and before drying, or either of the oxides may be dried and combined with the other in the form of the hydrogel. More intimate union has been obtained by preparing the alumina gel or hydrogel and adding it to a silica sol during gelation as shown in U. S. Patent 2,307,878.

A still more intimate association of silica and alumina is obtained by cogelling, by which is meant the simultaneous gelling of the silica and the alumina from a mixture of their salts or sols. To obtain a true cogel, it is necessary to control the conditions such as hydrogen-ion concentration (pH), so that neither oxide will be precipitated when the sols are mixed. Precipitation occurs when the crystallization forces result in the segregation of the molecules of oxide with the formation of solid oxide or hydrated oxide independent of the other ingredients of the catalyst. When this occurs the amorphous crystalline precipitate produces a friable mass of relatively inferior catalytic activity and generally undesirable characteristics.

The true cogel is a transparent gelatinous solid known as an ultragel which becomes a true solid on elimination of water. The oxides are associated in the cogel in an arrangement dependent largely on their arrangement in the sols from which they were produced. It is well recognized that sols in general, and particularly sols of silica and alumina, possess a micellar structure. Thus the sols are in fact dispersions of macromolecules of hydrated oxides, etc. in contrast to the molecular dispersions which we encounter in salt solutions. It is this macromolecular structure of the alumina and silica sols which exists before they are cogelled that is responsible for the desirable characteristics of these catalysts inasmuch as the true molecular associations of silica and alumina as found in their chemical combinations, for example aluminum silicate, are practically without value as catalysts.

As indicated hereinabove, the undesired precipitation of alumina in the preparation of alumina-silica cogels has been something of a problem and it has not been found possible heretofore to prepare a true cogel of silica and alumina containing more than about 25 to 30 per cent alumina. Attempts to increase the amount of alumina have resulted in precipitation of the alumina as a fluocculent precipitate giving catalysts with inferior characteristics. Rapid mixing of the sodium silicate and aluminum sulfate to form the silica and alumina sols instantaneously has succeeded in producing cogels in which the alumina content approached 30 per cent. However, these gels, having been formed from molecular dispersions of the salts rather than from the separately prepared sols, lacked several desirable characteristics.

According to our invention, we have discovered that cogels of silica and alumina can be prepared with any desired alumina concentration by separately preparing silica and alumina sols and adjusting the hydrogen ion concentration within a critical range so that when the two sols are mixed there is substantially no change in hydrogen ion concentration. The resulting sol mixture will thereupon gel to a clear, transparent, vibrant ultragel, substantially without clouding and without precipitation of alumina. In order to obtain a true ultragel, we have found that the hydrogen ion concentration must be adjusted to a value within the range of pH 3.5 to 6.5, the preferred range being about 4.5 to 4.8. The time required for gelling depends on the hydrogen ion concentration, the temperature and other factors, lower hydrogen-ion concentrations requiring more time. The resulting cogel is non-zeolitic in character, in sharp contrast to the gels prepared in alkaline solution. We have found that the non-zeolitic cogel of our invention is much superior to the zeolitic type gels as a cracking catalyst.

In preparing our catalyst, we prepare a silica sol from a suitable silicate solution, for example from sodium silicate, by the addition of acid, usually sulfuric acid, altho hydrochloric acid, formic acid, or other acid may be used. We prefer to adjust the concentrations of the silicate and acid solutions to provide a silica sol having a concentration of about 10 per cent $SiO_2$ with a hydrogen ion concentration of about 4.0 to 5.2 pH, preferably about 4.6. The alumina sol is prepared by the method described in U. S. Patent Re. 22,196 and U. S. 2,449,847, according to which amalgamated aluminum metal is dissolved in water containing a peptizing agent, preferably a weak acid such as acetic or formic acid. For this purpose acetic acid of about one to two per cent concentration is very satisfactory. The amount of aluminum and acetic acid and the time of reaction is chosen to provide an alumina sol containing about two to six per cent $Al_2O_3$. The two sols are mixed in the proper proportions to give the desired catalyst composition and then allowed to gel, gelation occurring instantaneously or within a half hour, depending on concentration of mixed sol, concentration of the individual sols before mixing, and pH of silica sol before mixing. The resulting hydrogel is carefully dried, for example by heating in a drying oven at about 175° F. It is then washed in water or in dilute acid, such as acetic or formic acid, to remove water-soluble salts, sodium sulfate, sodium acetate, etc. Fragmentation of the dry gel usually occurs when contacting with water. After careful washing for a period of several hours or days, the washed gel is dried and calcined. The resulting gel product may be used in fine granular form in a fluidized solid conversion operation or it may be pilled for use in fixed bed conversion operations.

The following example describes the preparation of a typical cogel alumina-silica catalyst according to our invention. A solution of N-Brand water glass was diluted and acidified with formic acid to a pH of about 5.4 to provide a silica sol containing 0.444 mols $SiO_2$ per liter. This sol was then mixed with an equal volume of alumina sol containing 0.222 mols $Al_2O_3$ per liter, the alumina sol having been prepared from aluminum amalgam and acetic acid as previously described, and having a pH of 4.8. The mixture of sols was allowed to set and after about ten seconds, solidified to a clear solid ultragel which was dehydrated in air at about 175° F. Within forty-eight hours the gel was substantially dry and was then immersed in distilled water, whereupon it broke up into small particles, adsorption of the water occurring with great rapidity. After standing twenty-four hours, the water was decanted and the gel was further washed with distilled water until a test of the washings failed to yield a residue. The gel was then dried and calcined at 1000° F. for four hours. The resulting product contained about 34 per cent $Al_2O_3$ and 66 per cent $SiO_2$.

In a second example, water diluted N Brand water glass was acidified with dilute sulfuric acid to a pH of 4.6 to provide a silica sol containing about eight per cent silica. This sol was mixed by means of a mixing nozzle with an equal volume of acetic acid alumina sol containing 3.8 weight per cent alumina. The resulting mixture of sols set in about two seconds. The gel was dried at 175° F. The dried gel was washed with water and then washed with water alkalized with $NH_4OH$ and rewashed with water. The washed gel was dried and calcined at 1000° F. The calcined gel catalyst contained about 32 per cent $Al_2O_3$.

This catalyst last described, was compared with a commercial synthetic silica-alumina catalyst in the conversion of a high sulfur gas oil having an A. P. I. gravity of 28.2 and sulfur content of 1.38 per cent by weight. The cracking reaction was conducted at 922° F., recycling all unconverted heavy distillates boiling above the gasoline end point. Two series of runs of one-hour duration were made at different extents of conversion, one series employing the cogelled alumina-silica catalyst of this invention and the other employing the commercial synthetic silica-alumina catalyst having about 14.8 to 15.0 per cent alumina content. The results are shown in the following table:

| Commercial Catalyst | | Cogelled Catalyst | |
| --- | --- | --- | --- |
| Conversion Weight Per Cent Per Pass | Per Cent S in Gasoline | Conversion Weight Per Cent Per Pass | Per Cent S in Gasoline |
| 61.3 | 0.507 | 57.8 | 0.155 |
| 46.4 | 0.479 | 43.6 | 0.259 |
| 37.2 | 0.321 | 39.8 | 0.238 |
| 30.0 | 0.356 | 30.4 | 0.314 |
| 20.0 | 0.489 | 23.4 | 0.380 |

Figure 3:
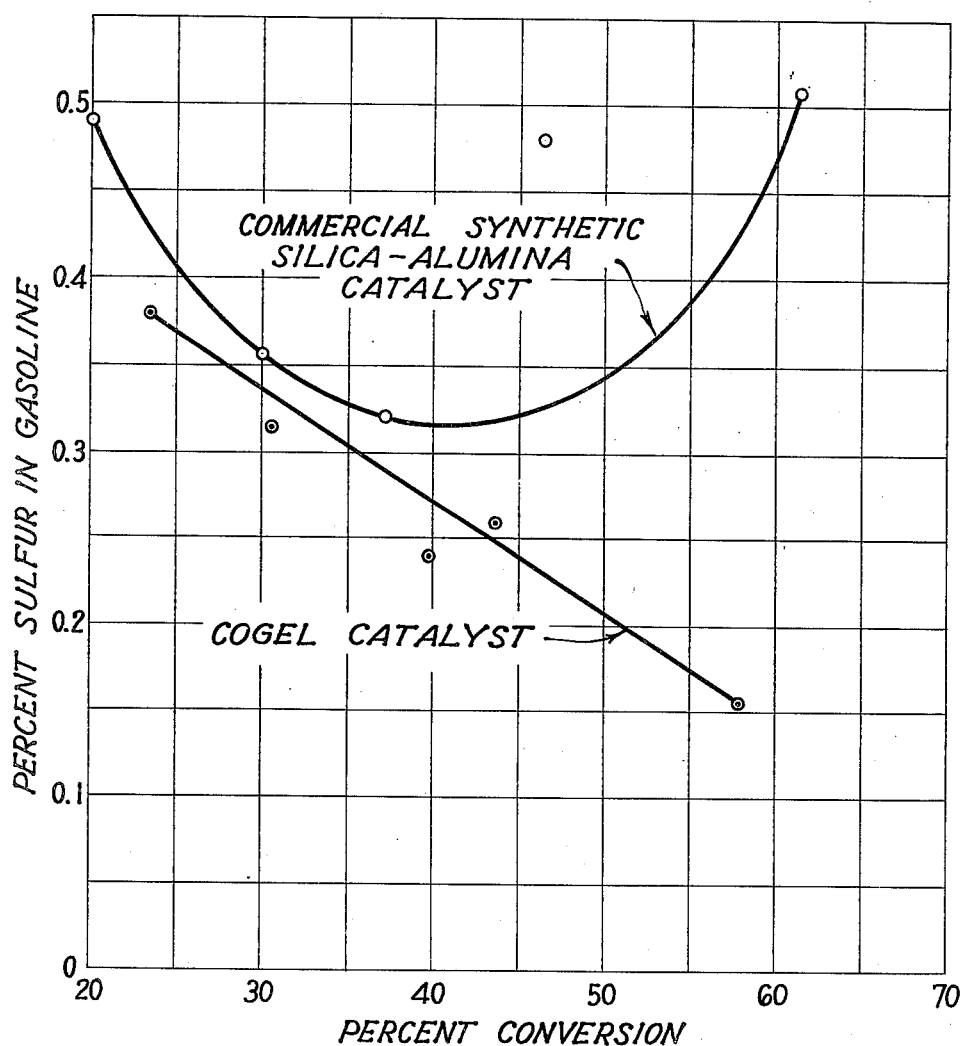
Figure 3 shows the relation between extent of conversion and sulfur removal.

These data are shown graphically in Figure 3. They show that the cogelled high alumina catalyst is far more effective in the removal of sulfur than the conventional synthetic silica-alumina catalyst.

Still a third example of silica-alumina catalyst was prepared in the same manner as the cogelled catalyst last described, except that formic acid-alumina sol was used and the concentration of the silica sol was sufficiently less to give a finished catalyst containing about 70 per cent $Al_2O_3$ and only about 30 per cent silica.

The conversion activity of our cogelled catalyst can be increased by immersing the gel, after drying, in various solutions, followed by a water wash. If solutions of certain electrolytes are employed, the activity is substantially increased as will be shown in the following table:

| | Activity |
|---|---|
| Dilute ammonia | 90 |
| Magnesium carbonate | 95 |
| Calcium bicarbonate | 100 |
| Dilute acetic acid | 125 |
| Concentrated ammonium chloride | 150 |
| Lake Michigan water | 75 |
| Distilled water (no treatment) | 82 |

Activity values are relative to standard acid treated montmorillonite clay catalyst taken as 60. It will be noted that the highest activity is obtained by aging in ammonium chloride solution and that tap water from Lake Michigan slightly diminished the activity from that obtained with distilled water.

Further comparisons were made between the cogelled catalyst of this invention and two commercial catalysts designated "Catalyst A" and "Catalyst D." Catalysts A and D contained about 14 to 15 per cent of alumina, the remainder being silica. Three samples of cogelled silica-alumina catalysts were prepared according to our invention with different concentrations of alumina, 58, 50 and 34 per cent. Tests were made on a small fixed bed catalyst testing unit with Mid-Continent gas oil having an A. P. I. gravity of 35.9. The cracking reaction was conducted in one hour tests at 925° F. and a space velocity of 180 grams of oil per 80 cc. catalyst per hour. Activity values are in relation to a standard acid-treated montmorillonite clay—Super Filtrol—taken as 60 activity, and are based on total conversion, i. e. 100 minus the cycle oil yield.

| Catalyst | $Al_2O_3$ Per Cent | Catalyst Treatment | Activity | Gas Factor | Carbon Factor |
|---|---|---|---|---|---|
| Cogelled | 58 | Ignited in air [1] | 95 | 1.7 | 2.8 |
| | 58 | Ignited in steam [2] | 100 | 1.1 | 1.5 |
| Silica | 50 | Ignited in air [1] | 134 | 1.4 | 2.3 |
| | 50 | Ignited in steam [2] | 69 | 1.0 | .8 |
| Alumina | 34 | Ignited in air [1] | 217 | .9 | 1.4 |
| | 34 | Ignited in steam [2] | 96 | .9 | .9 |
| Commercial "A" | | Ignited in air [1] | 182 | 1.0 | 1.1 |
| | | Ignited in steam [2] | 41 | .9 | |
| Commercial "D" | | Ignited in air [1] | 141 | 1.1 | 1.2 |
| | | Ignited in steam [2] | 40 | .8 | |

[1] Ignited in air at 1000° F., 4 hours.
[2] Ignited in steam at 1200° F., 16 hours.

It will be seen from the foregoing table that our cogelled catalyst combines a high initial activity with an exceptionally high stability to steam, whereas the commercial catalysts, altho having a satisfactory initial activity, lose activity rapidly when contacted with steam at a high temperature. The steam treatment at 1200° F. for sixteen hours is a measure of the stability of the catalyst in use where it must be subjected to unavoidable amounts of steam when being regenerated at high temperature. Heretofore the silica-alumina catalysts have suffered severely by the action of steam and the importance of overcoming this disadvantage can hardly be estimated.

The above table also shows that the cogelled catalyst of this invention is quite satisfactory from the standpoint of gas and carbon factors. It is to be observed that the gas and carbon factors increase with increasing alumina content but that the difference is slight with the catalysts which have been subjected to steam treatment.

The effect of increasing the alumina content of the catalyst is generally to increase activity of the steamed catalyst as shown in the curves in Figure 1.

Figure 2:
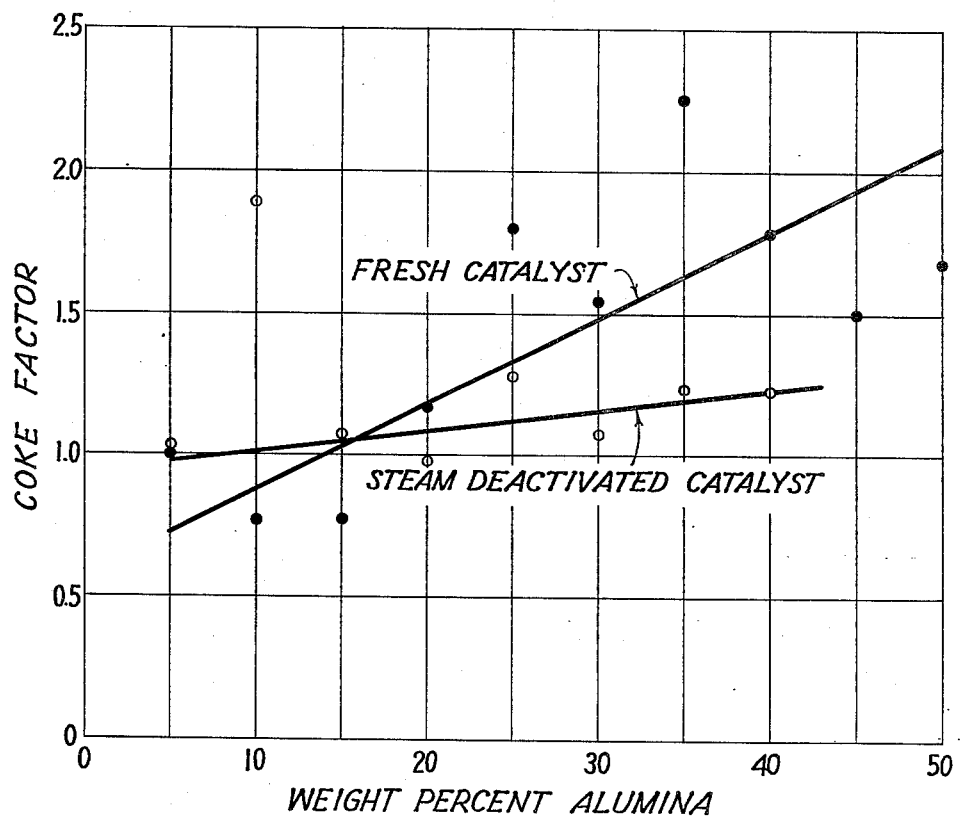
Figure 2 shows the relation between alumina content and the coke-producing activity of the catalyst.

Figure 2 shows the relation between coke factor and alumina content from which it will be seen that there is a slight increase of coke factor with alumina content. The points obtained after steaming are more consistent than those obtained on the fresh catalyst but this is believed to be attributable to minor experimental variations in the method of preparation. Data not given here, on the variation in gas factor with alumina content, show a slight decrease in gas factor with increased alumina content for the fresh catalyst.

It will be observed from the foregoing data that the cogelled silica-alumina catalyst according to our invention combines the unique properties of high activity, high alumina content, and extraordinary resistance to deactivation by steam and that all these advantages are obtained with little or no disadvantage from increased coke and gas production. We believe this unique combination of properties is attributable to the true ultragel structure of the catalyst which has heretofore been unobtainable by any of the methods employed in catalyst manufacture. By our method of preparation, we can produce catalysts with any desired alumina content, for example, from 30 or 35 up to 75 per cent or higher, whereas heretofore it has not been possible to prepare true ultragel catalysts in this range of alumina contents. We believe that the high alumina content accounts to a large extent for the resistance to steam deterioration, but all high alumina catalysts prepared heretofore have suffered the disadvantage of undesirably increasing coke and gas production. Our ultragel catalyst is free from these disadvantages while at the same time retaining the advantage of high resistance to steam deterioration. Being a true ultragel, our catalyst is also capable of being prepared in the form of masses or spherical particles of high physical strength, if desired, or it may be prepared in the form of a granular powder which can be used in fluidized operations as such, or pelleted and employed in fixed beds. If it is desired to prepare the catalyst in the form of spherical beads or microspheres, this can be accomplished by gelling droplets of the mixed sols in suspension in an oil bath or other suitable immiscible liquid bath, by spray drying in a heated gas atmosphere or by other well-known techniques. The gel particles can be washed free of sodium salts while still in the hydrogel stage before drying, distilled water or acidulated water having a pH of about 3.5 to 6.5 being used in the washing operation.

Having thus described our invention what we claim is:

1. The method of preparing an improved silica-alumina catalyst which comprises mixing an alumina hydrosol having a pH between 3.5 and 6.5 into a silica hydrosol having a pH between 3.5 and 6.5, allowing the mixture to set to a transparent, vibrant ultragel, washing said ultragel substantially free of salts, and drying and calcining said ultragel.

2. The method of claim 1 wherein the amount of said alumina hydrosol combined with said silica hydrosol is sufficient to produce a catalyst having an alumina content within the range of about 30 to 75 percent $Al_2O_3$ by weight.

3. The method of claim 1 wherein said silica hydrosol has a pH between about 4.0 and 5.2.

4. The method of preparing an improved silica-alumina catalyst which comprises mixing an alumina hydrosol having a pH between 3.5 and 6.5 into a silica hydrosol having a pH between 3.5 and 6.5, allowing the mixture to set to a transparent, vibrant ultragel, drying said ultragel and washing it substantially free of salts, and thereafter drying and calcining the washed gel.

5. A process for the manufacture of an improved alumina-silica catalyst which comprises admixing an aqueous solution of an alkali metal silicate with acid in a sufficient quantity to adjust the pH of said aqueous solution to a level between 3.5 and 6.5, and with an alumina hydrosol having a pH between 3.5 and 6.5, continuing the period of reaction for a time sufficient to form a transparent, vibrant silica-alumina ultragel, and washing, drying, and calcining said ultragel.

6. A process for the manufacture of an improved silica-alumina catalyst which comprises admixing an aqueous solution of an alkali metal silicate with acid in a sufficient quantity to adjust the pH of said aqueous solution to a level between 3.5 and 6.5, and with an aqueous alumina sol having a pH between 3.5 and 6.5 and containing in solution an organic acid having a dissociation constant of less than $1 \times 10^{-3}$, continuing the period of reaction for a time sufficient to form a transparent, vibrant silica-alumina ultragel, and washing, drying, and calcining said ultragel.

7. The process of claim 6 further characterized in that said organic acid is acetic acid.

MARVIN DEN HERDER.
LLEWELLYN HEARD.

REFERENCES CITED

The following references are of record in the file of this patent:

UNITED STATES PATENTS

| Number | Name | Date |
| --- | --- | --- |
| Re. 22,196 | Heard | Oct. 6, 1942 |
| 2,276,314 | Kirk | Mar. 17, 1942 |
| 2,326,706 | Thomas et al. | Aug. 10, 1943 |
| 2,334,872 | Free et al. | Nov. 23, 1943 |
| 2,356,303 | Connolly | Aug. 22, 1944 |
| 2,396,758 | Stratford | Mar. 10, 1946 |
| 2,449,847 | Heard | Sept. 21, 1948 |
| 2,477,373 | Hunter | July 26, 1949 |